US005557691A

United States Patent [19]
Izuta

[11] Patent Number: 5,557,691
[45] Date of Patent: Sep. 17, 1996

[54] IMAGE PROCESSING SYSTEM

[75] Inventor: Naoki Izuta, Kawasaki, Japan

[73] Assignee: Fujitsu Limited, Kawasaki, Japan

[21] Appl. No.: 386,192

[22] Filed: Feb. 9, 1995

Related U.S. Application Data

[63] Continuation of Ser. No. 84,019, Jun. 3, 1993, abandoned.

[30] Foreign Application Priority Data

Jun. 30, 1992 [JP] Japan .................................. 4-172105

[51] Int. Cl.$^6$ ..................................................... G06K 9/42
[52] U.S. Cl. ............................................. 382/299; 395/128
[58] Field of Search ..................................... 382/299, 298, 382/292, 306, 317, 177, 305; 395/128

[56] References Cited

U.S. PATENT DOCUMENTS

| | | | |
|---|---|---|---|
| 4,881,069 | 11/1989 | Kameda et al. | 382/47 |
| 5,048,101 | 9/1991 | Kurosu et al. | 382/47 |
| 5,138,668 | 8/1992 | Abe | 382/177 |
| 5,153,936 | 10/1992 | Morris et al. | 382/47 |
| 5,185,817 | 2/1993 | Degi et al. | 382/47 |
| 5,313,572 | 5/1994 | Yamamoto et al. | 382/306 |

FOREIGN PATENT DOCUMENTS 0150988  8/1985  European Pat. Off. ....... G06K 15/10

OTHER PUBLICATIONS

*IBM Technical Disclosure Bulletin*, vol. 30, No. 7, Dec. 1987, "Multi–Font Cathode Ray Tube Display Adapter Circuit for a Personal Computer," pp. 311–313.

Primary Examiner—Yon J. Couso
Attorney, Agent, or Firm—Staas & Halsey

[57]  ABSTRACT

An image processing system which includes a storage device that stores drawing information corresponding to the resolution, the stored drawing information being changeable when the resolution of the image processing system is changed. A buffer temporarily stores format codes corresponding to image information to be displayed on the display device. A host processing unit receives the format codes from the buffer and the drawing information from the storage device and converts the format codes into modified format codes in accordance with the received drawing information so that the modified format codes represent image information which is displayable on the display device. The invention also compares the resolution of image information to be displayed with the resolution of image information currently displayed and changes the resolution of the system if the resolution of image information to be displayed is different from the current resolution.

12 Claims, 11 Drawing Sheets

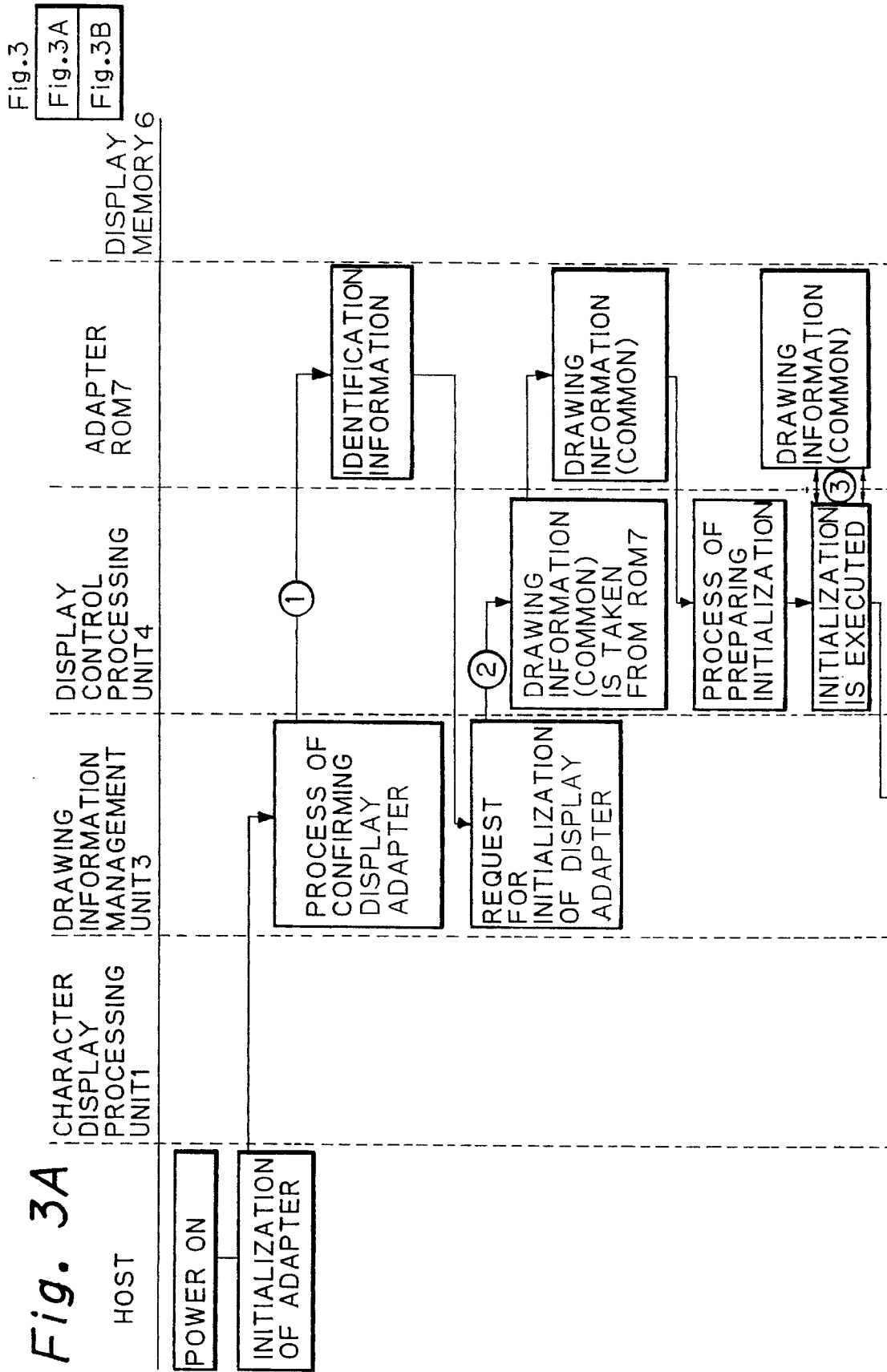

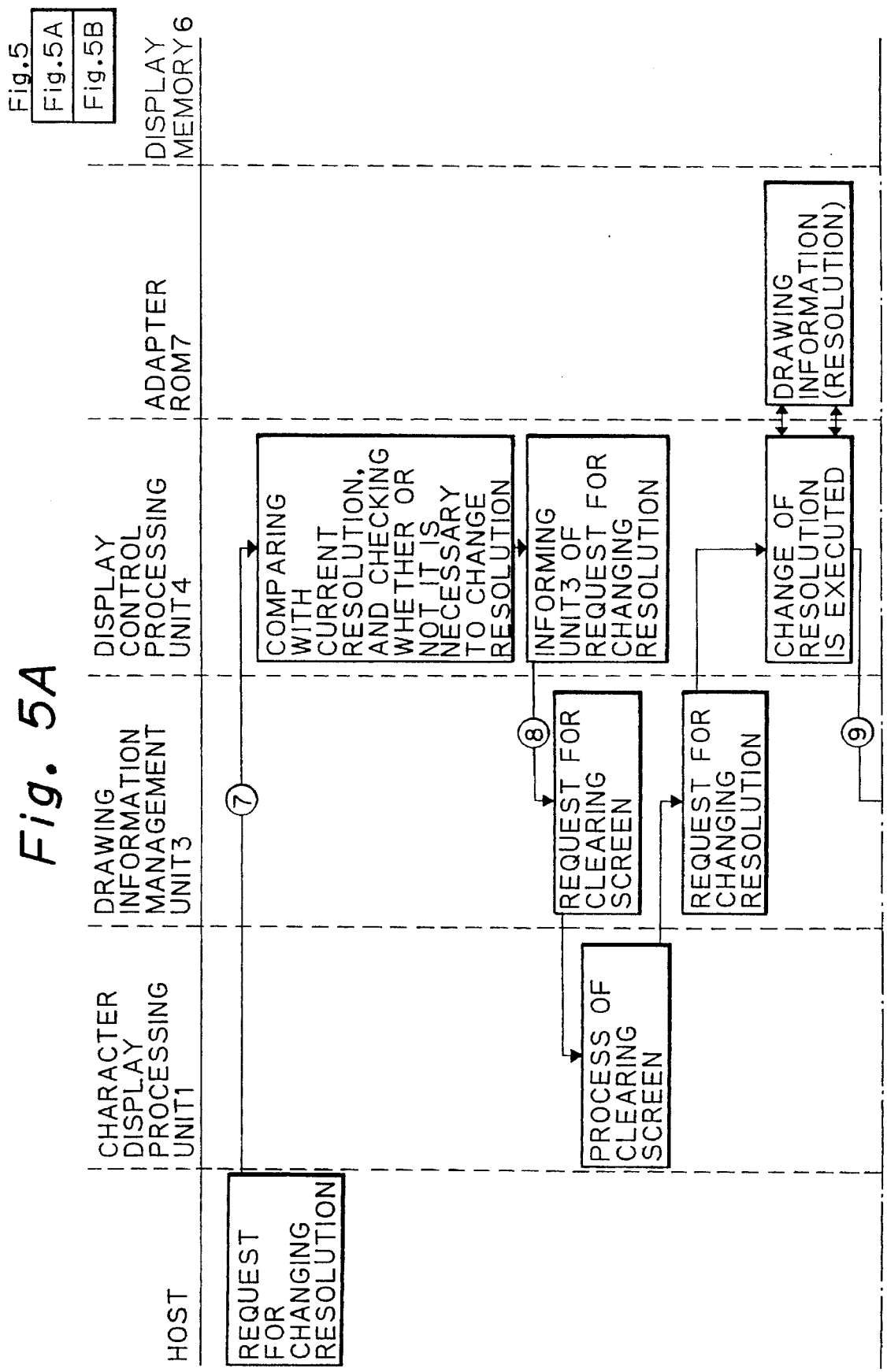

IMAGE PROCESSING SYSTEM

This application is a continuation of application Ser. No. 08/084,019, filed Jun. 30, 1993, now abandoned.

BACKGROUND OF THE INVENTION

1. Field of the Invention

The present invention relates to an image processing system for displaying desired image information, such as characters, graphics and pictures, on a screen of a display unit, e.g., CRT (Cathode Ray Tube), monitor or the like.

More specifically, the present invention relates to an image processing system which enables image information written into a bit-map memory having a new specification to be easily sent from a new type of display adapter to a display unit, in the case where such a new adapter is provided as hardware.

Furthermore, the present invention relates to an image processing system which enables the image information that has been displayed on the screen to be continuously displayed with a sufficient accuracy without necessity for modifying and exchanging the specifications of host units, even in the case where the resolution of the image information on the screen is changed.

2. Description of the Related Art

In recent years, a number of image processing systems having bit-map memories, have been produced in order to display various image information on a display unit, such as a CRT. The image information includes characters, graphics and pictures. With respect to display hardware represented by the size of bit-map memories of the respective image processing systems, there are many values of memory capacity. For example, one system has a smaller memory capacity such that only a monochrome display can be produced. Another system has a relatively large memory capacity such that 256 colors can be produced. Still another system has a remarkably large memory capacity such that full-color display utilizing as many as 160,000 colors can be produced.

Further, with respect to hardware and software for display of the image processing systems, there are many levels of functions which these systems can perform. For example, one system contains a bit-map memory only in principle and has relatively low cost. Another system has an additional function referred to as a graphics accelerator, which enables the drawing process to be executed at high speed, as well as a simple function utilizing a bit-map memory only.

In many cases, such image processing systems are provided for users in the form of adapters which are to be connected to an I/O (Input/Output) bus, e.g., the VME (Versa Module European) bus. When various image information (such as characters, graphics and pictures) is to be written into the bit-map memory of the image processing system, it is necessary for such image information to be processed by the above-mentioned image processing system, taking into consideration the type of the bit-map memory used by units concerned with the drawing process within the given system.

Further, in the case where the function of the drawing process, e.g., the character display process, is provided by the image processing system in the form of a standard specification, the system is required to execute such a drawing process assuredly for any kind of adapter which will be realized in the future. Namely, even when various kinds of bit-map cards {for example, an adapter including an adapter ROM (Read Only Memory)}, each of which has a hardware specification different from the standard specification, is provided, it is necessary for the given system to take in and utilize the drawing information contained in the above-mentioned bit-map cards in order to easily extend the display function.

Further, with respect to resolutions of the image information in the bit-map memories, a number of image processing systems, which extend from the fields of personal computers through workstations and include various kinds of resolutions, are currently provided. In many cases, software working on these systems is operative under the condition that the above-mentioned software is conscious of these resolutions. If all these software packages, related with the respective resolutions, are to be utilized effectively in the given image processing system, it is often necessary for such a system to have a function in which the changeover process of these resolutions can be executed, e.g., by utilizing another kind of software that supports a plurality of resolutions and allows them to be operative.

Further, in such a system where a plurality of resolutions can be supported, the system is required to accurately display the image information that has been displayed on the screen before changing the resolution, even when the resolution of the image information on the screen has been changed while characters, etc., are being displayed on the screen. After the resolution has been changed, the system is also required to continue the same drawing process as that executed heretofore.

Here, some operations of image processing systems according to the prior art will be explained more specifically.

In the case where a new type of adapter is fabricated (i.e., in the case where the specification of hardware of the system is to be changed by adopting such a new type of adapter), it becomes naturally necessary to change the specification of software of the system simultaneously. Therefore, every time a new type of adapter is provided for a system, the specifications of the hardware and the software thereof have to be changed. To avoid such troublesome work, in the systems according to the prior art utilized in the fields of personal computers, workstations and the like, the kind of available bit-map memories in the adapters, which can be connected to the I/O bus, is likely to be limited to a certain extent. Further, when a given system is required to support a new available bit-map memory, a process of modifying the drawing information stored in ROM within a mainframe of the system is executed, or otherwise another process of supporting the new bit-map memory by a newly developed model (software) is executed.

To be more specific, the portion having the function of drawing process within a mainframe of the system, which the system provides mainly as software and which constitutes the main part of host image processing units of the system, is modified in a manner such that the software is conscious of the specification of hardware in a new bit-map memory card. In this way, the above-mentioned portion executes a drawing process and a changeover process of resolutions of the image information. Furthermore, when another new bit-map memory card is to be connected to the I/O bus, the software of the above-mentioned portion within a mainframe is sometimes replaced with a newly developed software in a region other than the mainframe.

Here, to allow some problems regarding such conventional image processing systems to be understood more clearly, a concrete configuration of bit-map memory for displaying image information on a screen will be described with reference to the related drawings of FIGS. 1A and 1B. In this case, an example in which characters are displayed on the screen will be explained representatively. Further, it should be noted that the whole bit-map memory having the memory capacity of 2048 bits×2048 bits is contained in the memory area of the system.

FIGS. 1A-1 and 1A-2 are diagrams for explaining a changeover process of resolutions of characters; and FIG. 1B is a diagram for explaining a drawing process of characters on a screen.

First, as shown in FIG. 1A-1, a portion of the whole memory area (2048 bits×2048 bits), which corresponds to a bit-map area having a resolution of 1280 bits×1024 bits, is assumed to be displayed on a screen of a CRT.

Next, as shown in FIG. 1A-2, it is assumed that a different bit-map memory card is provided, and that the resolution of characters in the same bit-map area has to be changed to the value of 1024 bits×768 bits.

The following Table I shows the definition of reference numerals in FIGS. 1A-1 and 1A-2.

TABLE I

| DESCRIPTION | REFERENCE NUMERAL |
|---|---|
| HEAD CO-ORDINATE OF CHARACTER DISPLAY AREA | 100 |
| BIT-MAP AREA | 102 |
| MEMORY AREA | 104 |
| CHARACTER DISPLAY AREA | 106 |
| SPACE BETWEEN THE LINES | 108 |

In this configuration of bit-map memory, each of memory addresses in the memory area is located in such a drawing process as shown in FIGS. 1B-1, 1B-2 and 1B-3. In FIGS. 1B-1, 1B-2 and 1B-3, reference numeral 110 corresponds to address 0, reference numeral 112 corresponds to address 1, reference numeral 113 corresponds to address N+1, and reference numeral 114 corresponds to address N. In this case, the memory addresses are sequentially located on the first line toward the right direction, such as address 0, address 1 and so forth. After the memory address has become address N on the rightmost position, i.e., the last column position, on the first line, address N+1 corresponding to the next memory address is moved to the leftmost position, i.e., the first column position, on the second line. Namely, the head address on the second line is equivalent to the memory address next to the last address on the first line. In this way, all the memory addresses are located in the whole memory area at every line.

Returning to FIG. 1A, even when the resolution is changed as described above, it is generally required to continue to display the same characters as those displayed before the change of resolution on the screen. To meet this requirement, drawing information, e.g., a head co-ordinate of character display area within the bit-map area, a space between the adjoining lines, etc., has to be defined as the drawing information dependent on resolution. In the portion having a function of drawing process, e.g., a function of character display process, within the mainframe of the system, memory addresses (which are necessary to display desired characters) are determined in accordance with the above-mentioned drawing information dependent on resolution.

However, in such a address-mapping method as described with reference to FIGS. 1B-1, 1B-2 and 1B-3, every time the resolution of characters is changed, the value of the head co-ordinate of character display area and the value of the space between the adjoining lines are likely to be changed. Therefore, memory addresses utilized for displaying desired characters are also changed. Even in this case, it is necessary to accurately display the same characters on the screen, regardless of the changeover process of resolutions.

As described above, in the case where a new bit-map memory is to be supported, the image processing system in the prior art is likely to deal with the new bit-map memory by executing a modification or exchange of programs stored in advance in the ROM in the mainframe, which is constructed as a part of the hardware. Alternatively, the system is likely to take measures by executing a modification or replacement of the portion having a function of drawing process, which is included in the mainframe and mainly realized as the software. In other words, either the hardware or software of host processing units of the system has to be modified or exchanged with another one, every time the new bit-map memory is provided. Therefore, a problem occurs that a troublesome work becomes necessary at the time of such a modification or exchange.

Further, in the case where the resolution is to be changed, it is difficult to always display the same characters as displayed previously on the screen with an accuracy, after the changeover process of resolutions has been executed. Therefore, another problem occurs that the form of each of the characters, etc., such as the position of the character to be displayed, the character size, and the space between the adjoining lines, is likely to be distorted.

SUMMARY OF THE INVENTION

In view of the the above-mentioned problems, the main object of the present invention is to provide an image processing system for displaying desired image information, such as characters, graphics and pictures, on a screen of a display unit, which enables a new bit-map memory to be easily taken in without the necessity for modifying and exchanging the specifications of the hardware or software of host processing units thereof.

A further object of the present invention is to provide an image processing system which includes a character display unit as one of the host processing units, that has a function of displaying desired characters by executing drawing process for a memory for display in an external memory unit in accordance with the designated drawing information, and which enables the drawing process and displaying process to be realized without changing specifications of the character display processing unit and the other host processing units, even when a new type of display adapter is connected to the system.

A still further object of the present invention is to provide an image processing system which has a function of displaying again characters that displayed previously in accordance with the designated drawing information at the time of the changeover process of resolutions, and which enables the characters to continue to be displayed with a sufficient accuracy after the resolution has been changed, even when a display adapter having a different size of bit-map memory area is connected to the system.

To attain the above objects, the image processing system according to the present invention includes storage means which stores in advance drawing information dependent on resolution of the image information; buffer means which temporarily stores desired image information, for which a request for display on the screen is made, in a format of codes; a plurality of host processing units, which take out the desired image information from the buffer means in a format of codes and convert the codes into another format such that the desired image information can be displayed on the screen, in accordance with the drawing information dependent on resolution that is sent from the storage means; and memory means for display, which enables the desired image information that is sent from the host processing units to be displayed on the screen.

In the case where the drawing information is changed, the host processing units receive the drawing information in the changed condition, and expand the desired image information stored in the buffer means in a format of codes on the basis of the drawing information in the changed condition. Further, the host processing units write the desired image information, after it is expanded, into the memory means for display, in order to display the desired image information after it is expanded.

Further, in the case where a request for changing the resolution is made, the host processing units compare the current resolution being utilized for display with the resolution of the desired image information on request for changing the resolution, and to check whether or not the the latter resolution is different from the current resolution.

Further, when it is determined that the latter resolution is different from the current resolution, the host processing units receive the drawing information which has the resolution corresponding to the desired image information on request for changing the resolution. Subsequently, the host processing units expand the desired image information stored in the buffer means in a format of codes on the basis of the drawing information which has a resolution corresponding to the desired image information on request for changing the resolution. Furthermore, the host processing units write the desired image information after it is expanded into the memory means for display, in order to display again the desired image information by utilizing the resolution corresponding to the desired image information on request for changing the resolution.

Preferably, the above-mentioned drawing information dependent on resolution at least includes the position for starting to display characters on the screen and the space between the adjoining lines of the characters.

Further, preferably, the buffer means is a character buffer which temporarily stores desired characters, in a format of character codes.

Further, preferably, the host processing units at least include a character display processing unit, which takes out the desired characters from the character buffer in a format of character codes, and which converts the character codes into another format such that the desired character can be displayed on the screen.

In a preferred embodiment, the above-mentioned storage means is constituted by an adapter ROM which is connected to the host processing units through I/O bus, and which stores in advance plural kinds of the drawing information dependent on resolution. Further, the memory means for display is constituted by a display memory, which functions a bit-map memory for displaying desired characters.

Further, in a preferred embodiment, the adapter ROM and the display memory are both provided as hardware in a form of a display adapter which is connected to the host processing units and to the display unit.

Alternatively, the storage means is realized by auxiliary storage means, e.g., a disk drive, which is located in the vicinity of the host processing units, outside the display adapter.

In such a construction of the system according to the present invention, the drawing information dependent on resolution is stored in advance in an external memory unit, e.g., the adapter ROM, the auxiliary storage means, or the like. Accordingly, when the drawing information is designated to be changed, the host processing units within the mainframe of the system can easily take the drawing information in the changed condition from the external memory unit in accordance with the designated drawing information. Further, the host processing units can easily execute the drawing process for the display memory and display the desired image information, e.g., desired characters, on the screen.

Consequently, even in the case where a new type of display adapter, etc., is connected to the system, it becomes possible for the desired image information to be rapidly displayed on the screen without changing specifications of the host processing units within the mainframe of the system.

Also, even in the case where a different type of display adapter having a different size of bit-map memory area is connected to the system and therefore the resolution is required to be changed, it becomes possible for the image information, e.g., characters, before the change of resolution, to continue to be displayed assuredly after the resolution has been changed.

BRIEF DESCRIPTION OF THE DRAWINGS

The above object and features of the present invention will be more apparent from the following description of the preferred embodiments with reference to the accompanying drawings, wherein:

FIGS. 1B-1, 1B-2 and 1B-3 are diagrams for explaining an address-mapping process of characters on a screen;

FIG. 2 is a block diagram showing a preferred embodiment of an image processing system according to the present invention;

FIG. 3 includes FIGS. 3A and 3B which are diagrams each for explaining operational sequences for initialization process in a preferred embodiment of the present invention;

DESCRIPTION OF THE PREFERRED EMBODIMENTS

Figures 1, 1A:
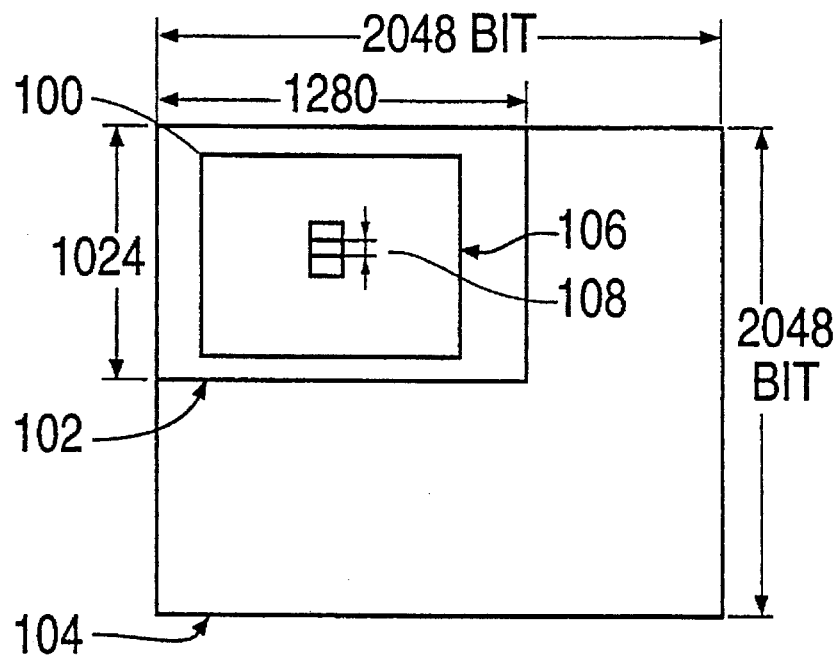
FIGS. 1A-1 and 1A-2 are diagrams for explaining a changeover process of resolutions of characters.
Figures 1, 1A, 2:
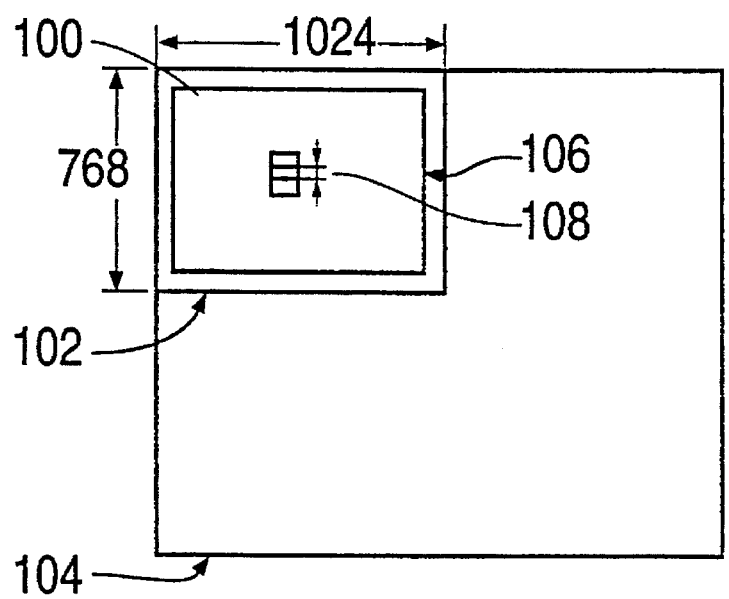
Figures 1, 1B, 2:
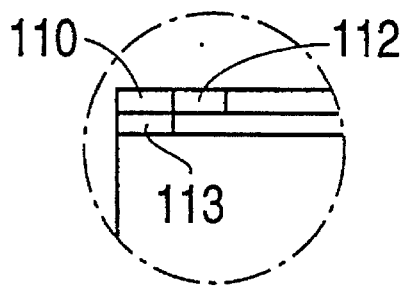

FIG. 2 is a block diagram showing a preferred embodiment of an image processing system according to the present invention. In this case, the essential construction of the system in the case where characters are processed and displayed as the representative of image information will be illustrated. Further, only the main part of the system will be representatively illustrated to simplify the explanation of a preferred embodiment (the whole systematic construction of a preferred embodiment will be described hereinafter with reference to FIG. 6).

In FIG. 2, the reference numeral 1 denotes a character display processing unit which is located within a mainframe of an image processing system, as one of the host processing units.

Further, the reference numeral 2 denotes a character buffer which temporarily stores desired characters for which a request for character display on a screen (not shown) of a display unit (not shown) is made, in a format of character codes.

Further, the reference numeral 5 denotes a display adapter which is provided for the system as hardware. The display adapter 5 includes a display memory 6, i.e., bit-map memory, for expanding these character codes into a format such that the desired characters can be displayed on the screen. Further, preferably, the adapter 5 includes an adapter ROM 7 which stores in advance drawing information 9R dependent on resolution of image information, e.g., characters.

Typically, the above-mentioned drawing information 9R dependent on resolution includes the position for starting to display characters on the screen (also referred to as a head co-ordinate of character display area in FIGS. 1A-1 and 1A-2, the space between the adjoining lines of the characters, and the like, at every allowable resolution in the system.

Further, the above-mentioned character display processing unit 1 is operative to take out the desired characters from the character buffer in a format of character codes, and to convert the character codes into another format such that the desired character can be displayed on the screen, in accordance with the drawing information 9R dependent on resolution that is sent from the adapter ROM 7. Subsequently, the above-mentioned character display processing unit 1 executes a drawing process for the display memory 6 by writing the desired characters in another format into the memory 6, in order to display the desired characters.

To be more specific about FIG. 2, first of all, when the image processing system has received a request for character display, the character display processing unit 1 once stores all the characters that are required in the character buffer 2, in a format of character codes. Next, the character display processing unit 1 takes out these character codes from the character buffer 2 in a format of character codes, on the basis of the drawing information 9R dependent on resolution that is sent from the adapter ROM 7. Further, the character display processing unit 1 expands the character codes output from the character buffer 2 and writes the expanded character codes, so that the desired characters can be displayed assuredly. Such a character display processing unit 1 has various kinds of functions, e.g., a function of monochrome display, a function of color display of 8 bit-type and a function of full-color display.

The character buffer 2 is adapted to input and store all the characters for which a request for character display has been made as the corresponding character codes. In this case, the character buffer 2 has a memory capacity that more than covers the whole area of the screen of the display unit.

The host processing units further includes a drawing information management unit 3 and a display control processing unit 4.

The drawing information management unit 3 is operative to read out the drawing information 9R having the resolution corresponding to the desired characters, and to store the drawing information 9R. Further, the drawing information management unit 3 is operative to store the drawing information 9R that has the designated resolution, and to send the drawing information 9R to the character display processing unit 1 so that the drawing process can be executed.

Furthermore, in accordance with a notification which is sent to the drawing information management unit 3 when the display control processing unit 4 has received a request for changing the resolution, the above-mentioned drawing information management unit 3 is operative to read out the drawing information 9R dependent on resolution, that has the resolution on request for changing the resolution, from the adapter ROM 7, and to store such drawing information 9R (also refer to the below-mentioned FIGS. 3A to 5).

The display control processing unit 4 is operative to compare the current resolution with the resolution of the desired characters on request for changing the resolution and to check whether or not the latter resolution is different from the current resolution, when a request for changing the resolution has been made. Also, the display control processing unit 4 controls the adapter ROM 7 to have various kinds of adapter control functions 10, e.g., diagnosis function, reset function, initialization function, function for reversing a black-and white on the screen, function for controlling colors of image information, and the like.

The display adapter 5 is utilized for displaying the desired characters, etc., by expanding them in a format such that the desired characters can be displayed on the screen. In this case, the adapter 5 is mainly constituted by a display memory 6, an adapter ROM and a adapter control unit 11 which performs various controls with respect to the adapter 5 per se.

The display memory 6 is located within the adapter 5 and actually executes an expansion of the desired characters output from the character buffer 2 in a format of character codes so as to be displayed on the screen. To be more specific, dot patterns, which are written into the display memory 6 and correspond to the desired characters, are read out from the memory 6 by the adapter 5 and finally displayed on the screen of the display unit in a form of the desired characters.

The adapter ROM 7 stores in advance identification information 8, drawing information 9 including the drawing information 9R dependent on resolution, and the adapter control functions 10.

The above-mentioned identification information 8 is adapted to define various kinds of predictable identification information. For example, the following kinds of identification information is defined:

(1i) the name of each of cards;

(2i) the name of each of vendors indicating the corresponding manufacturer;

(3i) the class of each of cards (information for categorizing the cards);

(4i) a copyright; and (5i) the size of ROM.

The above-mentioned drawing information 9 is adapted to define various kinds of predictable drawing information. Generally, the above-mentioned drawing information 9 are constituted by common drawing information 9C and the drawing information 9R dependent on resolution as described briefly.

First, the common drawing information 9C is a kind of drawing information which is not related with the resolution of image information and common to every image information. For example, the following kinds of common drawing information 9C is defined:

(1c) the number of kinds of resolutions which the system must support;

(2c) the offset position of a frame memory, i.e., a display memory, in the space constituted by each of cards;

(3c) the size of the frame memory;

(4c) the number of pixels constituting image information (e.g., the depth of a screen, the information with respect to monochrome or color display);

(5c) the offset position of a control register in the space constituted by each of cards; and (6c) the size of the control register in the space constituted by each of cards.

Second, the drawing information 9R dependent on resolution is a kind of drawing information which is provided at every resolution. For example, the following kinds of drawing information 9R is defined (also refer to the below-mentioned FIG. 8):

(1r) the height and width of a screen;

(2r) the head co-ordinate of character display area (the co-ordinate corresponding to the leftmost and uppermost position of character display area on a screen);

(3r) the number of available lines and the number of available columns;

(4r) the space between the adjoining lines (the pitch of lines);

(5r) the size of each of the characters to be displayed (the height and width of each character);

(6r) the distance between the adjoining characters;

(7r) the width of character pattern data; and (8r) the cursor pitch.

The adapter control functions 10 controls various kinds of functions in the display adapter 5. For example, the following kinds of adapter control functions 10 are defined:

(1a) diagnosis function of an adapter;

(2a) reset function of an adapter;

(3a) initialization function of an adapter in the case where the resolution is one of parameters changeover function of different resolutions;

(4a) ON/OFF function of each of video signals; and (5a) function for reversing a black-and white on the screen (this function is applicable only for monochrome display).

In this case, the adapter control unit 11 is arranged in the display adapter 5 to enable these adapter control functions to be executed assuredly.

To repeat, in such a construction of the preferred embodiment as shown in FIG. 2, when the drawing information 9R dependent on resolution is changed, the character display processing unit 1 receives the drawing information 9R in the changed condition, and expands the desired characters stored in the character buffer 2 in a format of character codes, on the basis of the above-mentioned drawing information 9R in the changed condition. Subsequently, the character display processing unit 1 writes the desired characters, after they are expanded, into the display memory 6, and finally allows the display unit to display the desired image information on the screen thereof.

Further, to repeat, when a request for changing the resolution is made, a display control processing unit 4 compares the current resolution with the resolution of said desired characters on request for changing the resolution, and checks whether or not the latter resolution is different from the current resolution. Further, when it is determined by the display control processing unit 4 that the resolution of the desired characters on request for changing the resolution is different from the current resolution, the drawing information management unit 3 takes out the drawing information 9R, which has the resolution corresponding to the desired characters on request, and sends the drawing information 9R to the character display processing unit 1.

Subsequently, the character display processing unit 1 expands the desired characters stored in the character buffer 2 in a format of character codes, on the basis of the drawing information 9R having the resolution of the desired characters, and writes the desired characters, after expansion, into the display memory 6, and finally allows the display unit to display the characters again with the resolution corresponding to the desired characters on request, on the screen thereof.

According to the preferred embodiment of the present invention as shown in FIG. 2, any predictable drawing information 9, including the drawing information 9R dependent on resolution, is stored in advance in an external memory unit such as the adapter ROM 7. In this case, when the drawing information is designated to be changed, the character display processing unit 1 can easily execute the drawing process for the display memory 6 to display the desired characters on the screen, in accordance with the designated drawing information 9R.

Therefore, the preferred embodiment of the present invention has an advantage in that, even though any adapter 5 having a new specification of hardware is connected to the system, the desired characters can be rapidly displayed on the screen without changing specifications of the character display processing unit 1, the display control processing unit 4, etc., within a mainframe of the system.

Also, the preferred embodiment has another advantage in that, even though any adapter 5 having a different size of bit-map memory area is connected to the system and therefore the resolution is required to be changed, the characters before the change of resolution can continue to be displayed with a sufficient accuracy after the resolution has been changed.

Hereinafter, more detailed description regarding some typical operations of such a preferred embodiment of the present invention will be given with reference to FIGS. 3A to 5. Further, any component that is the same as that mentioned before will be referred to using the same reference number.

Figure 3B:
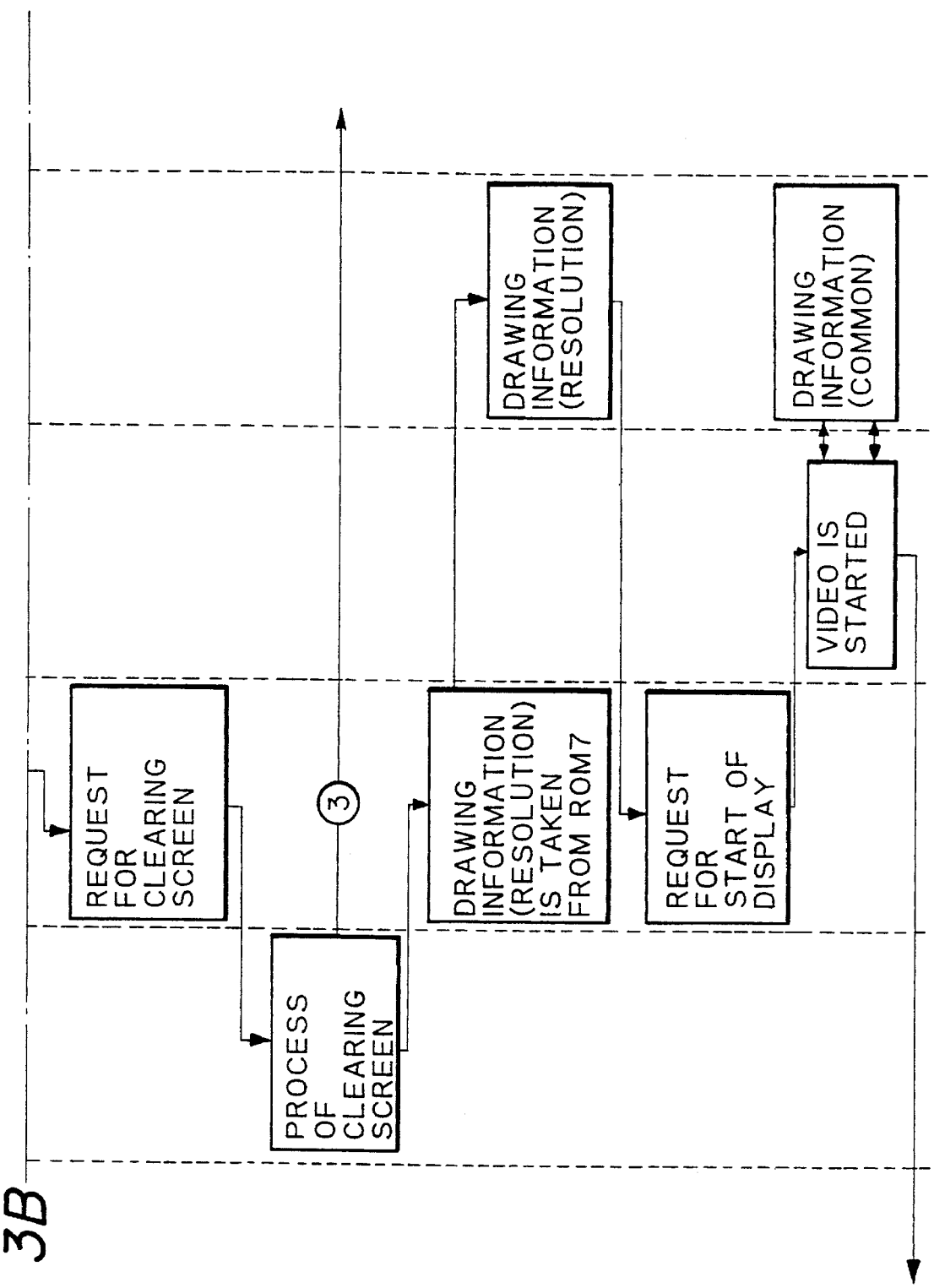

FIGS. 3A and 3B are diagrams each for explaining operational sequences for initialization process in a preferred embodiment shown in FIG. 2.

Figures 1, 1B, 2, 3:
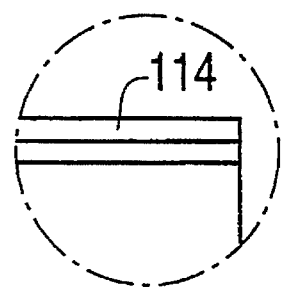
Figures 1, 1B:
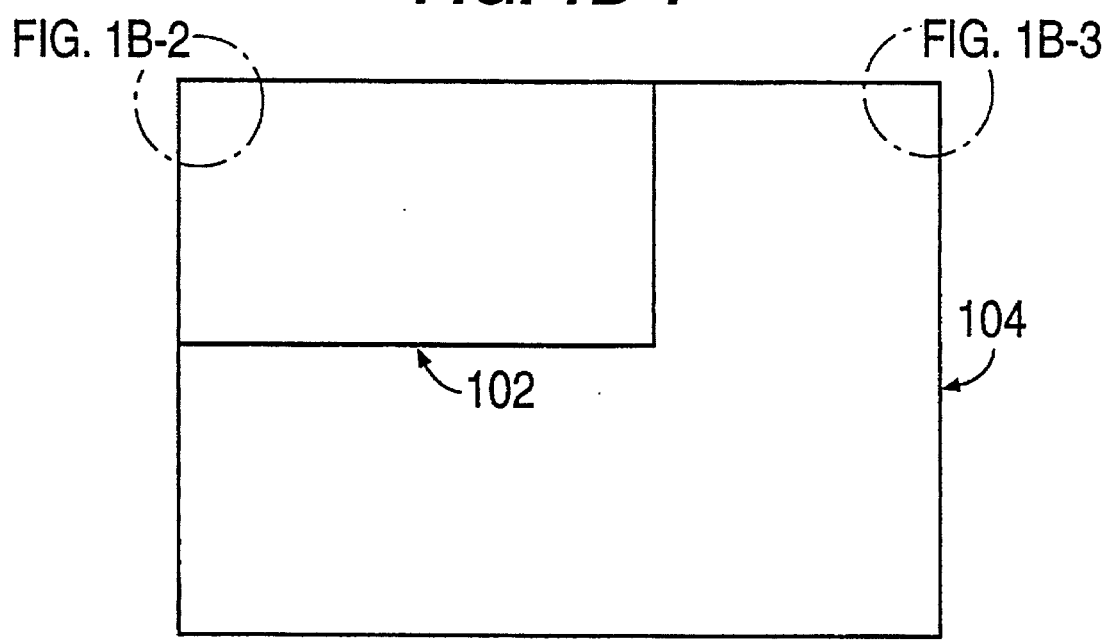
Figure 2:
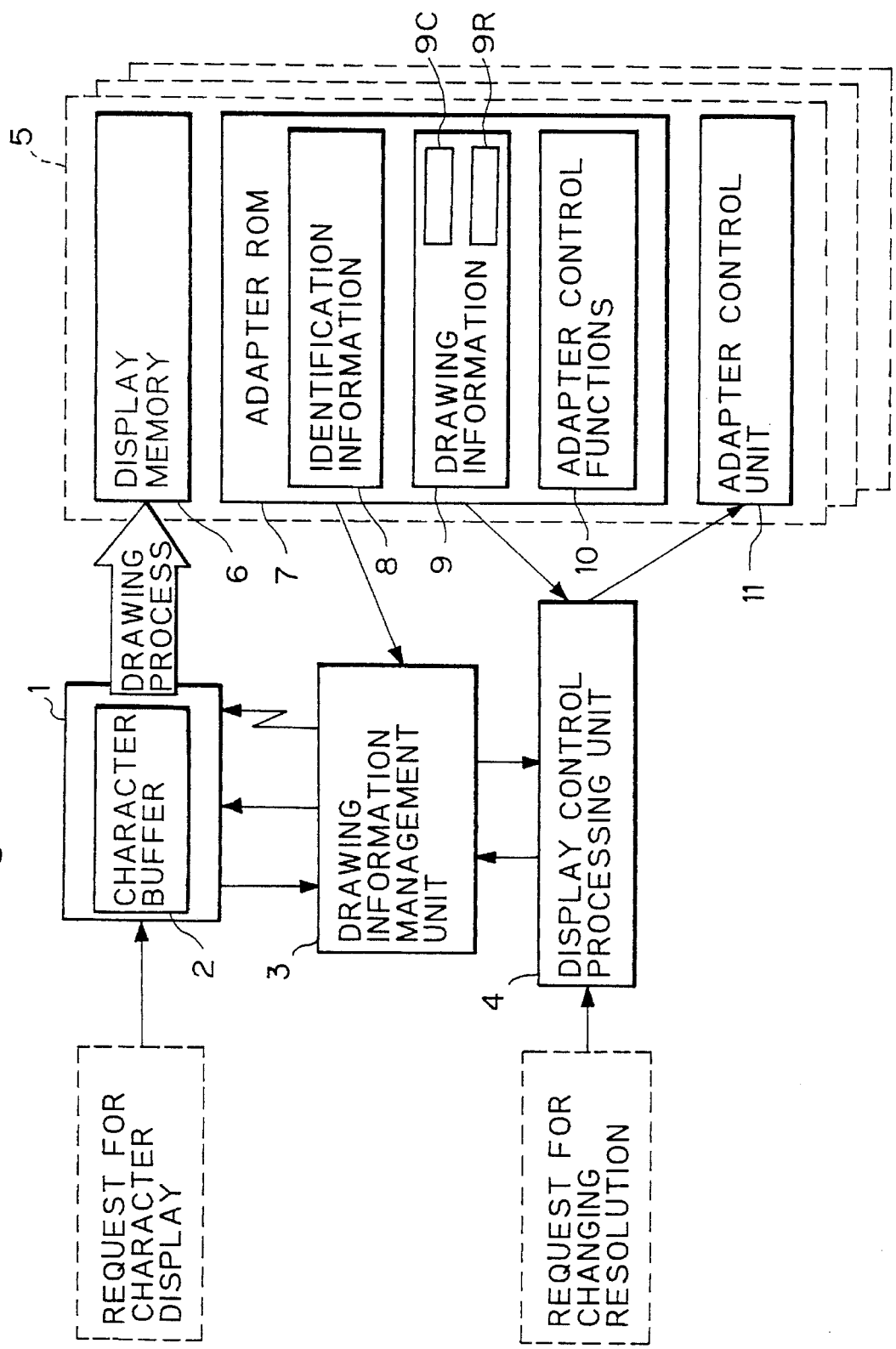

All the sequences for the initialization process, in the case where an electric power supply is switched on, should be illustrated in one drawing of FIG. 3. However, in this case, since it it difficult to be contained in one sheet, FIG. 3 is divided into two drawings of FIGS. 3A and 3B. FIGS. 3A indicates the first half of the sequences for initialization process, while FIGS. 3B indicates the remaining second half of these sequences.

In FIG. 3A, in the sequence ①, a drawing information management unit 3 takes out the identification information 8 regarding a display adapter 5 from the adapter ROM 7 in the adapter 5, in order to confirm the characteristics of the adapter 5, in the case where initialization process of the adapter 5 is to be executed at the time when an electric power supply is switched on and a CPU (Central Processing Unit) of a host computer issues a command for initialization. Here, the above-mentioned identification information 8 includes the name of card, the class of card, the size of ROM, and the like.

Further, in the sequence ②, the drawing information management unit 3 makes a request for initialization of the adapter 5 for the display control processing unit 4, in accordance with the identification information 8 which the drawing information management unit 3 obtained in the sequence ①. The display control processing unit 4, which received the request for initialization, takes out the common drawing information 9C from the adapter ROM 7, and then prepares the initialization of the adapter 5. Here, as the common drawing information 9C, the specific information regarding the hardware (offset position of a frame memory in the space constituted by the card, the size of the frame memory, etc.) is obtained.

Further, in the sequence ③, the display control processing unit 4 refers to the above-mentioned drawing information 9C in the adapter ROM 7, and executes the initialization of the display adapter 5 by sequentially utilizing various kinds of adapter control functions, such as a diagnosis function, a reset function and a initialization function.

Further, as shown in FIG. 3B, after the initialization of the display adapter 5 is completed, the display control processing unit 4 notifies the character display processing unit 1 of the request for initialization of the screen via the drawing information management unit 3. Further, the character display processing unit 1 executes the process of clearing the screen and writes all "0 (zeros)" into the display memory 6. In this case, the process of clearing the screen is preferably necessary for the form of characters, etc., on the screen to be prevented from being distorted due to the change of memory address utilized for displaying the desired characters. Subsequently, the drawing information management unit 3 takes out the drawing information 9R dependent on resolution from the adapter ROM 7, and notifies the display control processing unit 4 of a request for the start of display. Then, the display control processing unit 4 utilizes a function of the start of display from among plural kinds of adapter control functions, and makes each video signal sent to the display unit become ON-state (active), and forces the content of the display memory 6 to start to be displayed on the screen.

As described above, when the electric power supply is switched on, one of host processing units, such as the drawing information management unit 3, confirms the identification information 8 in the the adapter ROM 7, and takes out the drawing information 9R dependent on resolution from the adapter ROM 7. Further, by utilizing this drawing information 9R, another one of host processing units, such as the display control processing unit 4, executes the initialization of the display adapter 5. Further, by means of the process of clearing the screen, still another one of the host processing units, such as the character display processing unit 1, resets the display memory 6. Further, the display control processing unit 4 makes each of video signals become ON-state, and allows the content of the memory 6 to be displayed on the screen.

In this case, the display control processing unit 4 is adapted to utilize the adapter control functions 10 stored in advance in the adapter ROM 7 within the display adapter 5, and to execute the diagnosis function, the reset function and the initialization function. Therefore, it is not necessary for the display control processing unit 4 to be aware of the hardware construction of the display adapter 5, etc. In other words, in the case where a new type of display adapter 5, which has a different specification of hardware, is connected to the current system, it is possible for the host processing units within the mainframe of the system to take out the identification information 8, the drawing information 9, the adapter control functions 10, etc., from the adapter ROM 7 within the adapter 5 and utilize them effectively.

Consequently, in the preferred embodiment, it becomes unnecessary for any one of the host processing units to be modified and exchanged every time the new type of display adapter 5 is connected to the system, unlike the prior art.

Figure 4:
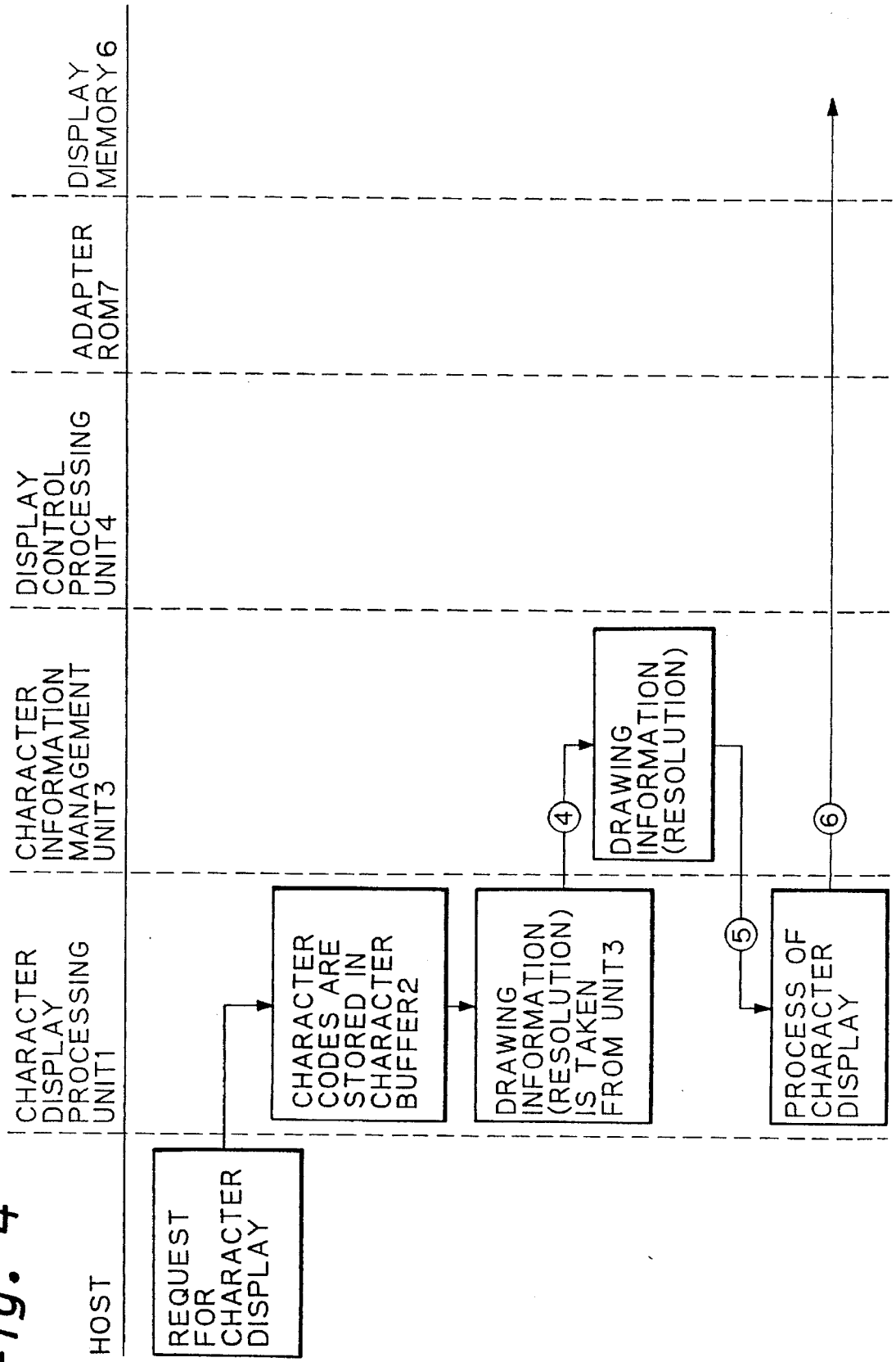
FIG. 4 is a diagram for explaining operational sequences for character display process in a preferred embodiment of the present invention.

FIG. 4 is a diagram for explaining operational sequences for character display process in a preferred embodiment shown in FIG. 2.

In FIG. 4, in the sequence ④, the character display processing unit 1 stores predetermined character codes in a character buffer 2, in accordance with a request for character display which is issued from a CPU of a host computer. Further, the character display processing unit 1 requires the drawing information management unit 3 to obtain the drawing information 9R dependent on resolution.

Further, in the sequence ⑤, the drawing information management unit 3 notifies the character display processing unit 1 of the drawing information 9R which is to be utilized by the character display processing unit 1 for executing the drawing process.

Further, in the sequence ⑥, the character display processing unit 1 utilizes the drawing information 9R which is sent from the drawing information management unit 3, and executes the drawing process of the character codes taken out from the character buffer 2. Subsequently, the character display processing unit 1 expands the character codes and writes them into the display memory 6. Further, video signals are sent from the display memory 6, i.e., bit-map memory, to the display unit, and the desired characters are displayed on the screen thereof.

As described above, when the request for character display is made, the characters on request are stored once in the character buffer 2 in a format of character codes. Further, by utilizing the drawing information 9R dependent on resolution that is sent from the drawing information management unit 3, the character display processing unit 1 expands the character codes, and writes them into the memory 6 in the display adapter 5, so that the desired characters can be displayed on the screen.

In this case, the character display processing unit 1 is adapted to execute the drawing process in accordance with the drawing information 9R sent from the drawing information management unit 3. Therefore, the character display processing unit 1 has only to execute the drawing process, on the basis of the position for starting to display characters on the screen and the space between the adjoining lines of the characters, etc., which the drawing information 9R dependent on resolution includes. Consequently, even in the case where the drawing information 9R dependent on resolution is changed, or the case the resolution is changed, it becomes possible for the system to rapidly display the desired characters without the necessity for modifying and exchanging the character display processing unit 1, etc.

Figure 5B:
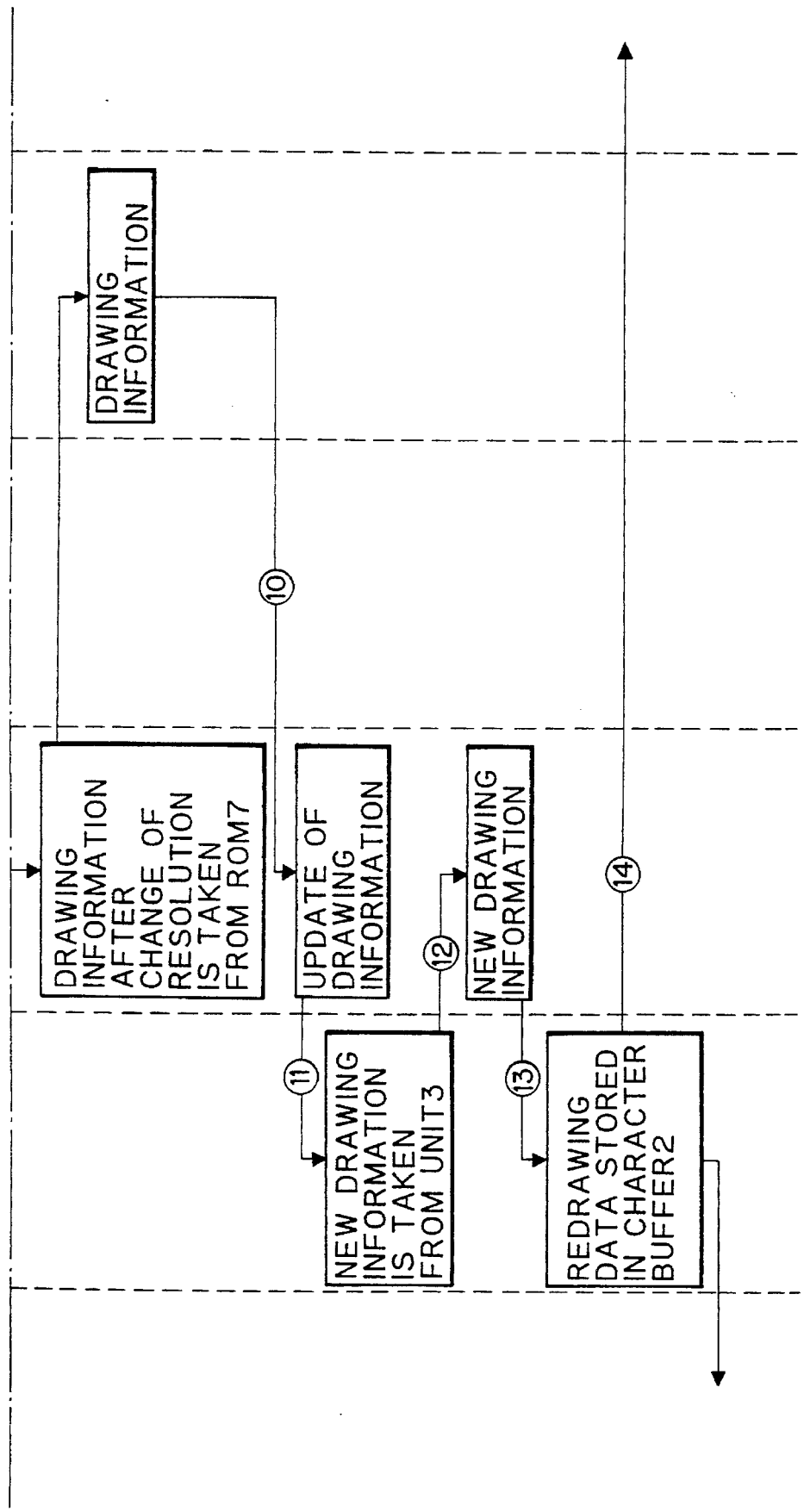
FIG. 5 includes FIGS. 5A and 5B which are diagrams each for explaining operational sequences for changeover process of resolutions in a preferred embodiment of the present invention.

FIGS. 5A and 5B are diagrams each for explaining the operational sequences for the changeover process of resolutions in a preferred embodiment of the present invention.

All the sequences for the changeover process of resolutions should be illustrated in one drawing of FIG. 5. However, in this case, for the reason similar to the case in FIG. 3, FIG. 5 is divided into two drawings of FIGS. 5A and 5B. FIGS. 5A indicates the first half of the sequences for changeover process of resolutions, while FIGS. 5B indicates the remaining second half of these sequences.

In FIG. 5A, in the sequence ⑦, a CPU of a host computer issues a command corresponding to a request for changing the resolution. Then, in accordance with this request, the display control processing unit 4 compares the current resolution being utilized for display with the resolution of the desired characters on request for changing the resolution, and checks whether or not the latter resolution is different from the current resolution.

As a result of the check by the display control processing unit 4, it is assumed to be detected that the latter resolution is different from the current resolution and the current resolution need to be changed to the latter resolution. In this case, as shown in the sequence ⑧, the display control processing unit 4 notifies the drawing information management unit 3 of the request for changing the resolution. On the other hand, if it is detected that the current resolution does not need to be changed, the sequences for the changeover process of resolutions are finished directly.

Further, in the sequence ⑨, the drawing information management unit 3 requires the character display processing unit 1 to clear the screen, in accordance with the request for changing the resolution which is sent from the display control processing unit 4 in the sequence ⑧, the character display processing unit 1 once executes the process of clearing the screen. Further, the character display processing unit 1 asks the drawing information management unit 3 to implement the request for changing the resolution. Subsequently, the drawing information management unit 3 makes the display control processing unit 4 execute the change of resolution.

Further, in FIG. 5B, as shown in the sequence ⑩, the drawing information management unit 3 makes the display control processing unit 4 execute the change of resolution for the drawing information management unit 3. Further, the drawing information management unit 3 takes out the drawing information 9R after the change of resolution, from the adapter ROM 7, and updates the drawing information stored therein.

Further, in the sequence ⑪, the drawing information management unit 3 notifies the character display processing unit 1 of the update of the drawing information 9R dependent on resolution in an asynchronous mode.

Further, in the sequence ⑫, the character display processing unit 1 requires the drawing information management unit 3 to obtain the new drawing information 9R after the update.

Further, in the sequence ⑬, in accordance with the request for obtaining this new drawing information 9R, the drawing information management unit 3 notifies the character display processing unit 1 of the new drawing information 9R, which has been obtained from the adapter ROM 7 and is to be utilized by the character display processing unit 1 for executing the drawing process. Further, the character display processing unit 1 updates the drawing information 9R stored therein, on the basis of the drawing information 9R which is sent from the drawing information management unit 3.

Further, in the sequence ⑭, the character display processing unit 1 utilizes the new drawing information 9R which is sent from the drawing information management unit 3, and executes the drawing process of the character codes taken out from the character buffer 2. Subsequently, the character display processing unit 1 expands the character codes and writes them into the display memory 6.

In this case, with respect to the data constituted by characters, etc., which were displayed heretofore, the character display processing unit 1 is adapted to rewrite the same data into the display memory 6, and to display them again on the screen by utilizing the resolution corresponding to the desired characters on request for changing the resolution. Consequently, in the preferred embodiment, it becomes possible for the data, which were displayed before the change of resolution, to continue to be displayed assuredly after the resolution has been changed.

Figure 6:
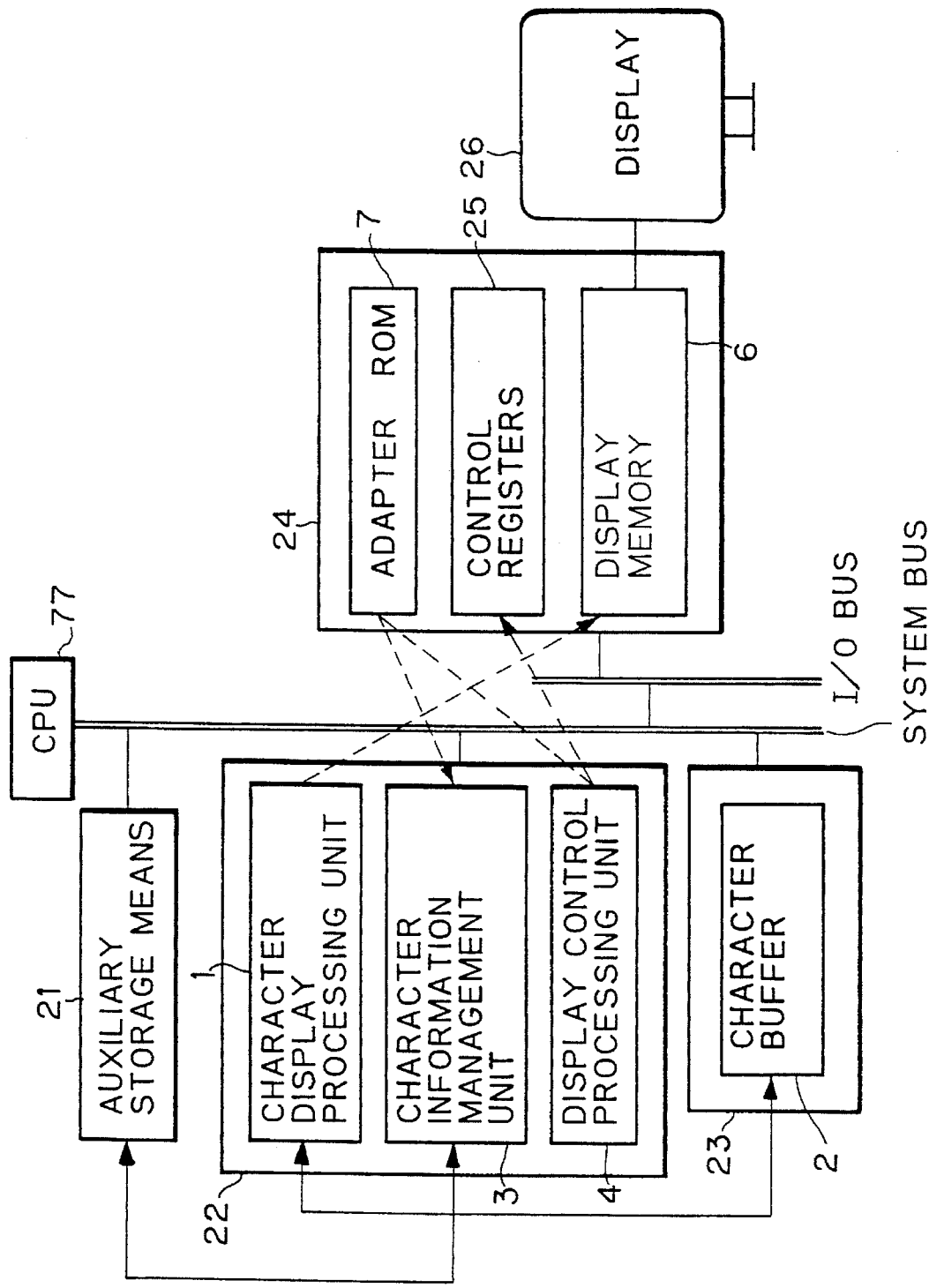
FIG. 6 is a block diagram showing the whole systematic construction of a preferred embodiment of the present invention.
Figure 7:
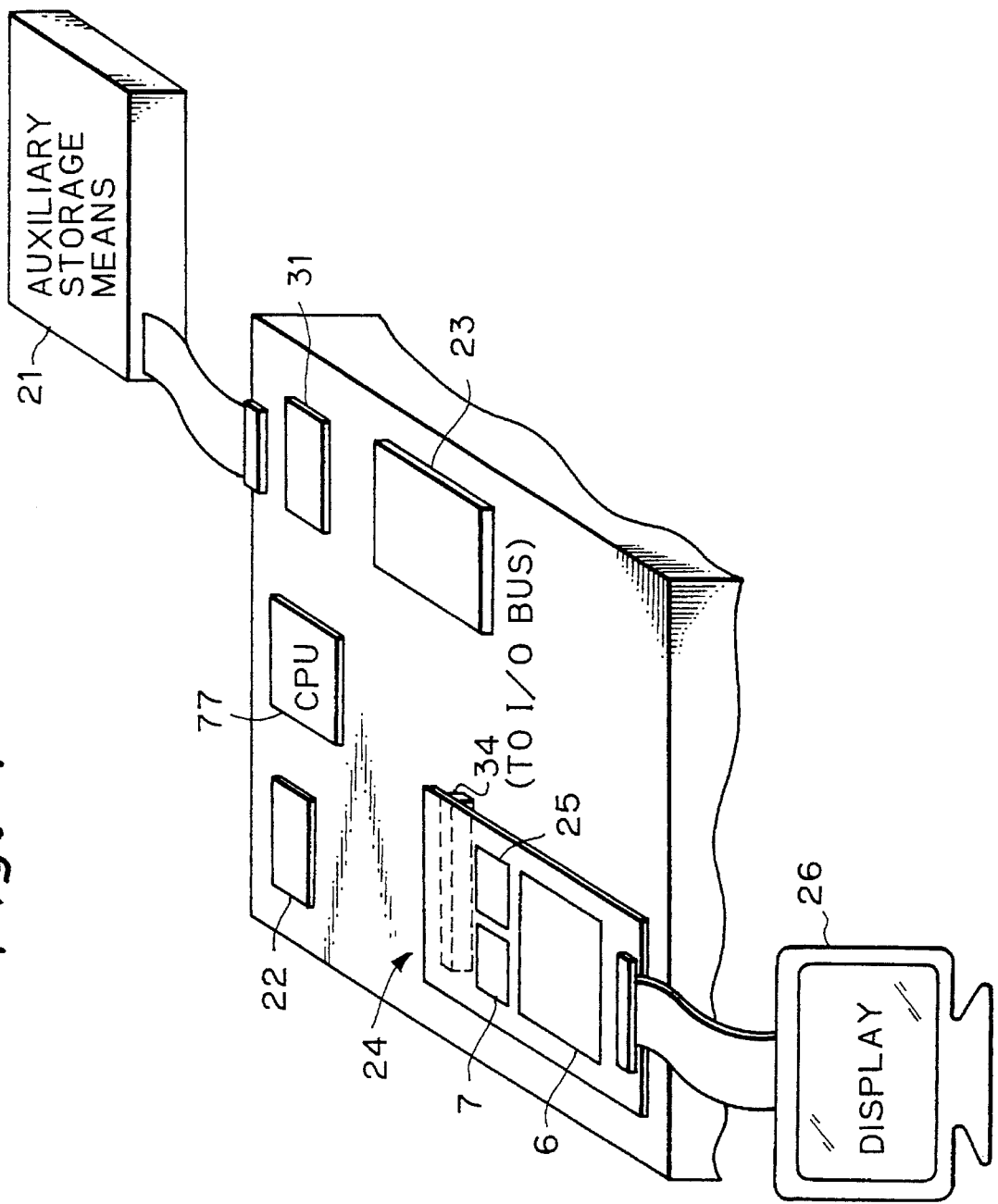
FIG. 7 is a perspective view showing the whole appearance of a preferred embodiment of the present invention.

FIG. 6 is a block diagram showing the whole systematic construction of a preferred embodiment of the present invention as in FIG. 2; and FIG. 7 is a perspective view showing the whole appearance of a preferred embodiment thereof.

In FIG. 6, auxiliary storage means 21 is located in an external memory unit the vicinity of a mainframe of an image processing system, in addition to another external memory unit such as the display adapter 5. Typically, the auxiliary storage means 21 is constituted by a disk drive having a plurality of disk as storage media. Such auxiliary storage means 21 is adapted to store in advance the information regarding the resolution which is utilized at the time when an electric power supply is switched on, and the like.

Further, in FIG. 6, a mainframe ROM 22 in a host computer of the system is a ROM which contains programs for operating the character display processing unit 1, the drawing information management unit 3, the display control processing unit 4, and the like, that are included in the mainframe ROM 22.

A main memory unit 23 is adapted to store various data and the other programs that are frequently utilized. In this case, particularly, the main memory unit 23 includes a character buffer 2 which stores temporarily the character code for which a request for character display is made. Alternatively, the character buffer 2 may be located within the character display processing unit 1, as illustrated in FIG. 2.

The mainframe ROM 22, the main memory unit 23 and the auxiliary storage means 21 are connected to a CPU 77 of the host computer, which controls their operations by sending them various commands via a system bus.

A display adapter 24 corresponds to the adapter 5 illustrated in FIG. 2, and is connected to the mainframe of the system via an I/O bus. The display adapter 24 is constituted by an adapter ROM 7, control registers 25, a display memory 6, and the like.

The adapter ROM 7 stores in advance identification information 8, drawing information 9 including the common drawing information 9C and the drawing information 9R dependent on resolution, the adapter control functions 10, and the like, as previously described with reference to FIG. 2.

Here, it should be noted that means for storing the above-mentioned identification information 8, drawing information 9, the adapter control functions 10, and the like is not limited to the adapter ROM 7. For example, these kinds of information can be also stored in the auxiliary storage means 21 such a disk drive.

The control registers 25 are registers for controlling all the components constituting the display adapter 24. The display unit 26, e.g., a CRT, a monitor, or the like, is adapted to display video signals read out from the display memory 6.

Further, the operational sequences in the whole system including auxiliary storage means 21, the adapter 24 and the display unit 26, in addition to the mainframe, will be explained with reference to FIG. 6, with respect to the two cases.

The first case where an electric power supply is switched on will be described. At the time when the power supply is switched on, the drawing information management unit 3 performs an access-operation to the adapter ROM 7 of the display adapter 24 connected to the I/O bus, and selects the display adapter 24 related with the character display, in accordance with the identification information stored in the adapter ROM 7.

Further, the display control processing unit 4 executes the diagnosis function which is defined as one of the adapter control functions 10 stored in the adapter ROM 7, with respect to the selected adapter 24. If a diagnosis of the adapter 24 is normally performed on the basis of the diagnosis function, then the display control processing unit 4 executes the reset function among the adapter control functions 10. Further, the display control processing unit 4 obtains the information regarding the resolution at the time when an electric power supply is switched on, from the auxiliary storage means 21, via the drawing information management unit 3. By using this drawing information as one of the parameters for operating the system, the display control processing unit 4 executes the initialization function from among the adapter control functions 10, and performs the initialization process.

Further, the display control processing unit 4 takes out the drawing information 9R, that is stored in the adapter ROM 7 and corresponds to the resolution of the desired characters for which a request for character display is made. In the case where any drawing information 9R corresponding to the resolution is not stored in the adapter ROM 7, the display control processing unit 4 determines that the selected adapter 24 does not support the resolution for the adapter 24 per se, and continues on the below-mentioned process by utilizing default resolution predetermined for such a case.

After the drawing information 9R dependent on resolution is taken out from the adapter ROM 7, the drawing information management unit 3 requires the character display processing unit 1 to clear the screen. The character display processing unit 1 once executes the process of clearing the screen in accordance with this requirement, by writing all "0 (zeros)" into the display memory 6. Further, by utilizing the drawing information 9R taken out from the adapter ROM 7, the display control processing unit 4 executes a function for making video signals become ON-state, which is defined as one of the adapter control functions 10. Subsequently, the display control processing unit 4 sends the video signals to the display unit 26, and makes the character display processing unit 1 start to display the data in the display memory 6 on the screen.

Hereinafter, the character display processing unit 1 utilizes the drawing information 9R taken out from the adapter ROM 7 via the display control processing unit 4, and executes the drawing process for the display memory 6, so that the desired characters can be displayed on the screen.

In this case, by changing the information regarding the resolution stored in the auxiliary storage means 21, it becomes possible to change the resolution at the time when an electric power supply is switched on and also the resolution at the time when the system is started up.

On the other hand, the second case where the display adapter 24 has a plurality of resolutions will be described. In this case, the CPU 77 of the host computer makes a request for changing the resolution for the display control processing unit 4. After the display control processing unit 4 clears the screen, it informs the drawing information management unit 3 that an event of the change of resolution has occurred. Further, the drawing information management unit 3 notifies the character display processing unit 1 of the new drawing information 9R, which has been obtained from the adapter ROM 7 and is to be utilized by the character display processing unit 1 for executing the redrawing process.

Further, the character display processing unit 1 utilizes the new drawing information 9R which is sent from the drawing information management unit 3, and executes the drawing process of the character codes taken out from the character buffer 2. Subsequently, the character display processing unit 1 expands the character codes and rewrites them into the display memory 6. By means of such a method, it can be assured that the accurate and recognizable characters continue to be displayed on the screen, even after the changeover process between a plurality of resolutions has been performed.

Here, to enable the actual image of the system of the preferred embodiment according to the present invention to be clearly perceived, the whole appearance of the system will be illustrated in FIG. 7, corresponding to FIG. 6.

As shown in FIG. 7, the system is constituted mainly by a mainframe portion arranged in the central portion, auxiliary storage means 21, a display adapter 24 and a display unit 26.

The mainframe portion includes a mainframe ROM 22, a CPU 77, a main memory unit 23, and a control unit 31 for auxiliary storage, which is provided for controlling the information stored in the auxiliary storage means 21.

The auxiliary storage means 21 is connected to the mainframe portion via a system bus, and typically stores the information regarding the resolution at the time when the electric power supply is switched on.

The display adapter 24 is connected to the mainframe portion via a connector 34, which is provided on the mainframe portion and coupled to an I/O bus. Further, the adapter 24 includes an adapter ROM 7, control registers 25, and a display memory 6 which is connected to the display unit 26.

Figure 8A:
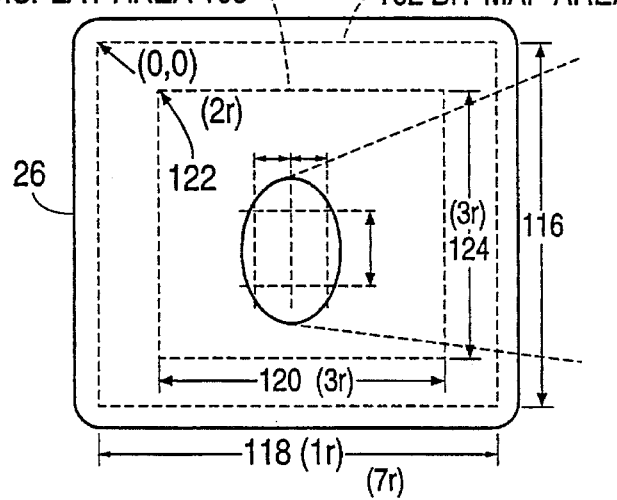
FIGS. 8A, 8B and 8C are conceptual views for explaining one example of drawing information dependent on resolution utilized for operational sequences of FIGS. 5A to 7.
Figure 8B:
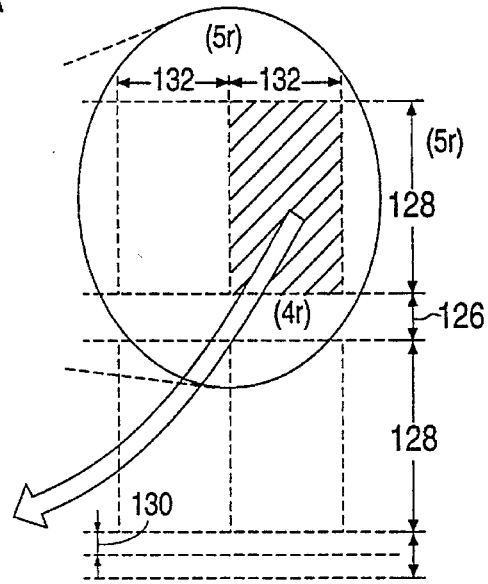
Figure 8C:
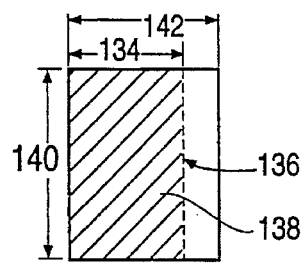

FIGS. 8A, 8B and 8C are conceptual views for explaining one example of drawing information dependent on resolution utilized for operational sequences of FIGS. 5A to 7.

The following Table II shows the definition of reference numerals in FIGS. 8A, 8B and 8C.

TABLE II

| DESCRIPTION | REFERENCE NUMERAL |
| --- | --- |
| CHARACTER DISPLAY AREA | 106 |
| BIT-MAP AREA | 102 |
| WHOLE HEIGHT | 116 |
| WHOLE WIDTH | 118 |
| THE NUMBER OF AVAILABLE COLUMNS | 120 |
| HEAD CO-ORDINATE | 122 |
| THE NUMBER OF AVAILABLE LINES | 124 |
| SPACE BETWEEN THE LINES | 126 |
| HEIGHT OF CHARACTER | 128 |
| HEIGHT OF CHARACTER | 128 |
| CURSOR PITCH | 130 |
| WIDTH OF CHARACTER | 132 |
| WIDTH OF CHARACTER | 132 |
| WIDTH OF CHARACTER | 134 |
| AREA OF PADDING DATA | 136 |
| AREA OF CHARACTER PATTERN DATA | 138 |
| HEIGHT OF CHARACTER | 140 |
| WIDTH OF CHARACTER PATTERN DATA | 142 |

In FIGS. 8A, 8B and 8C, to enable the drawing information 9R dependent on resolution (see, for example, FIG. 2) to be easily understood, a portion of the characters on the screen of the display unit 26 will be illustrated in an enlarged form.

The numbers from (1r) to (5r) and the number (7r) respectively corresponds to some of the drawing information 9R described before. Here, the correspondence between the above-mentioned numbers and the kind of drawing information will be mentioned again as follows:

(1r) the whole height and width of a screen;

(2r) the head co-ordinate of character display area within a bit-map area where the head co-ordinate thereof is always (0, 0);

(3r) the number of available lines and the number of available columns;

(4r) the space between the adjoining lines;

(5r) the size of each of the characters to be displayed, e.g., the height and width of each character; and (7r) the width of character pattern data.

To be more specific about each character, an area of padding data is provided between the adjoining characters on the same line, in order to distinguish the characters from each other. Therefore, each character is displayed within an area of the character pattern data indicated by the hatched portion.

As described above, the present invention has been illustrated with respect to one preferred embodiment for rapidly displaying desired characters as the representative of image information. However, the present invention is applicable to an image processing system for displaying desired graphics, desired pictures and the like, on a screen of a display unit, e.g., CRT.

While the present invention has been described as related to the preferred embodiment, it will be understood that various changes and modifications may be made without departing from the spirit and the scope of the invention as hereinafter claimed.

I claim:

1. An image processing system which displays image information on a display device and has multiple resolutions for displaying the image information, wherein the current resolution represents the resolution of image information being displayed and the desired resolution represents the resolution of image information to be displayed, the image processing system comprising:

storage means for storing sets of drawing information, each set corresponding to a respective resolution and the current drawing information representing a set of drawing information corresponding to the current resolution;

buffer means for temporarily storing format codes corresponding to image information to be displayed on the display device, the desired resolution corresponding to the format codes stored in the buffer means;

a host processing unit which:
  receives the current drawing information from the storage means,
  receives the format codes from the buffer means,
  compares the current resolution with the desired resolution,
  receives updated drawing information from the storage means when the current resolution is different from the desired resolution, the updated drawing information being a set of drawing information corresponding to the resolution of the image information to be displayed,
  converts the format codes into modified format codes in accordance with the updated drawing information when the current resolution is different from the desired resolution, and
  converts the format codes into modified format codes in accordance with the current drawing information when the current resolution is not different from the desired resolution; and memory mapping means, connected to the display device and receiving the modified format codes from the host processing unit, for providing memory-mapping of the modified format codes to enable the image information to be displayed on the display device.

2. An image processing system as set forth in claim 1, the image information including characters and the image processing system using a start position to display characters on the display device, and parallel, spaced lines exist between adjoining characters displayed on the display device, wherein:

each set of drawing information includes the start position and the spacing between the parallel, spaced lines of adjoining characters;

the buffer means includes a character buffer which temporarily stores format codes corresponding to characters to be displayed on the display device;

the host processing unit includes
  a character display processing unit which receives the format codes from the character buffer and converts the format codes into the modified format codes,
  a display control processing unit which compares the current resolution with the desired resolution, and
  a drawing information management unit which receives, when the resolution of the characters to be displayed is determined by the display control processing unit to be different than the current resolution, a set of drawing information corresponding to the desired resolution from the storage means and stores the received set of drawing information; and the memory mapping means enables the characters to be displayed with the corresponding resolution.

3. An image processing system as set forth in claim 2, further comprising an input/output bus, wherein the storage means is an adapter read only memory which is connected to the host processing unit through the input/output bus and stores the sets of drawing information, and the memory mapping means is a bit-map memory.

4. An image processing system as set forth in claim 3, wherein the adapter read only memory and the memory mapping means are both provided as a display adapter which connects to the host processing and the display device.

5. An image processing system as set forth in claim 2, wherein the storage means is an auxiliary storage device which is located in the vicinity of the host processing unit and stores the sets of drawing information on resolution, each kind of said drawing information at least including the position for starting to display characters on said screen and the space between the adjoining lines of said, and the memory mapping means is a bit-map memory.

6. An image processing system which displays image information on a screen of a display device, wherein the image processing system has a resolution which is changeable by changing hardware/software associated with the display device, the image information including characters and the imaging processing system using a start position to display characters on the display device, and parallel, spaced lines exist between adjoining characters when the adjoining characters are displayed on the display device, the image processing system comprising:

storage means for storing drawing information which corresponds to the resolution, the drawing information including the start position and the spacing between the parallel, spaced lines of adjoining characters, the stored drawing information being changeable when the resolution of the image processing system is changed;

buffer means for temporarily storing format codes corresponding to characters to be displayed on the display device;

a host processing unit which receives the format codes from the buffer means and the drawing information from the storage means and converts the format codes into modified format codes in accordance with the received drawing information so that the modified format codes represent characters which are displayable on the display device; and memory mapping means, connected to the display device and receiving the modified format codes from the host processing unit, for providing memory-mapping of the modified format codes to enable the characters corresponding to the format codes received by the host processing unit to be displayed on the screen of the display device, wherein, when the resolution of the image processing system is changed, the drawing information received by the host processing unit from the storage means corresponds to the changed resolution, and the host processing unit, causes the screen of the display device to be cleared, converts the format codes into modified format codes in accordance with the received drawing information corresponding to the changed resolution, and causes the image information to be displayed on the cleared screen of the display device at the changed resolution, in accordance with the modified format codes.

7. An image processing system as set forth in claim 6, further comprising an input/output bus, wherein the storage means is an adapter read only memory which is connected to the host processing unit through the input/output bus and stores multiple sets of drawing information, each set including the start position and the spacing between parallel, spaced lines of adjoining characters, and the memory mapping means is a bit-map memory, wherein the adapter read only memory and the memory mapping means are both provided as a display adapter which connects to the host processing unit and the display device.

8. An image processing system as set forth in claim 6, further comprising an input/output bus, wherein the storage means is an adapter read only memory which is connected to the host processing unit through the input/output bus and stores multiple sets of drawing information, each set including the start position and the spacing between parallel, spaced lines of adjoining characters, and the memory mapping means is a bit-map memory.

9. An image processing system as set forth in claim 6, wherein the storage means includes an auxiliary storage device which is located in the vicinity of the host processing unit and stores multiple sets of drawing information dependent on resolution, each set of drawing information including the start position and the spacing between the parallel, spaced lines of adjoining characters, and the memory mapping means is a bit-map memory.

10. An image processing system which displays image information on a display device and has multiple resolutions for displaying the image information, wherein the current resolution represents the resolution of image information being displayed and the desired resolution represents the resolution of image information to be displayed, the image information including characters and the image processing system using a start position to display characters on the display device, and parallel, spaced lines exist between adjoining characters displayed on the display device, the image processing system comprising:

storage means for storing sets of drawing information, each set corresponding to a respective resolution and the current drawing information representing a set of drawing information corresponding to the current resolution, each set of drawing information including the start position and the spacing between the parallel, spaced lines;

buffer means for temporarily storing format codes corresponding to characters to be displayed on the display device, the desired resolution corresponding to the format codes stored in the buffer means;

a host processing unit which includes:
 a character display processing unit which receives current drawing information from the storage means, stores the received current drawing information and receives the format codes from the buffer means,
 a display control processing unit which compares the current resolution with the desired resolution, and
 a drawing information management unit which receives updated drawing information from the storage means when the current resolution is different from the desired resolution and stores the updated drawing information, the updated drawing information being a set of drawing information corresponding to the resolution of the image information to be displayed, the character display processing unit converting the format codes into modified format codes in accordance with the updated drawing information when the current resolution is different from the desired resolution and converting the format codes into modified format codes in accordance with the current drawing information when the current resolution is not different from the desired resolution; and memory mapping means, connected to the display device and receiving the modified format codes from the host processing unit, for providing memory-mapping of the modified format codes to enable the image information to be displayed on the display device.

11. An image processing system as set forth in claim 10, further comprising an input/output bus, wherein the storage means is an adapter read only memory which is connected to the host processing unit through the input/output bus and stores the sets of drawing information, and the memory mapping means is a bit-map memory.

12. An image processing system as set forth in claim 10, wherein the storage means is an auxiliary storage device which is located in the vicinity of the host processing unit and stores in the sets of drawing information, and the memory mapping means is a bit-map memory.

* * * * *

UNITED STATES PATENT AND TRADEMARK OFFICE
CERTIFICATE OF CORRECTION

PATENT NO. : 5,557,691
DATED : September 17, 1996
INVENTOR(S) : Naoki Izuta

It is certified that error appears in the above-indentified patent and that said Letters Patent is hereby corrected as shown below:

col. 9, line 45, insert --/-- between "parameters" and "changeover"

Signed and Sealed this

Fourth Day of February, 1997

Attest:

BRUCE LEHMAN

*Attesting Officer*  *Commissioner of Patents and Trademarks*